(12) United States Patent
Nakayama et al.

(10) Patent No.: US 6,445,445 B1
(45) Date of Patent: Sep. 3, 2002

(54) EVALUATION APPARATUS FOR AN OPTICAL FIBER TRANSMISSION LINE

(75) Inventors: Norio Nakayama, Atsugi; Takashi Oshimi, Isehara; Shigeo Hori; Masaaki Tamakoshi, both of Atsugi, all of (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/613,534

(22) Filed: Jul. 10, 2000

(30) Foreign Application Priority Data

Jul. 12, 1999 (JP) .......................................... 11-197659

(51) Int. Cl.$^7$ ............................................. G01N 21/00
(52) U.S. Cl. ...................................................... 356/73.1
(58) Field of Search ........................ 356/73.1; 702/68; 324/121 R; 345/814

(56) References Cited

U.S. PATENT DOCUMENTS 5,801,953 A 9/1998 Thoma et al.
5,870,184 A * 2/1999 Furuhashi .................. 356/73.1

OTHER PUBLICATIONS

Generic Requirements GR–196–Core Issue 1, Sep. 1995, (Generic Requirements for Optical Time Domain Reflectometer (OTDR) Type Equipment, Bellcore (Bell Communications Research)) , pp. B–1 to B–12.

* cited by examiner

Primary Examiner—Frank G. Font
Assistant Examiner—Tu T Nguyen
(74) Attorney, Agent, or Firm—Frishauf, Holtz, Goodman & Chick, P.C.

(57) ABSTRACT

An optical time domain reflectometer receives a return light of an optical pulse incident on a measurement target optical fiber formed out of a plurality of optical fibers coupled in series, and measures the splice loss, return loss and unit length loss of the measurement target optical fiber. A maximum value detector detects a maximum value due to an absolute value for the splice loss and maximum values for the return loss and the unit length loss of the measurement target optical fiber, respectively, in response to the return light. A display unit displays the maximum value due to the absolute value for the splice loss and the maximum values for the return loss and the unit length loss according to items of the splice loss, the return loss and the unit length loss based on output from the maximum value detector.

14 Claims, 5 Drawing Sheets

EVALUATION APPARATUS FOR AN OPTICAL FIBER TRANSMISSION LINE

CROSS-REFERENCE TO RELATED APPLICATIONS

This application is based upon and claims the benefit of priority from the prior Japanese Patent Application No. 11-197659, filed Jul. 12, 1999, the entire contents of which are incorporated herein by reference.

BACKGROUND OF THE INVENTION

The present invention relates to an optical time domain reflectometer (to be referred to as "OTDR" hereinafter) and particularly relates to an optical pulse test system or OTDR making various measurements such as measurements of the loss, fault and the like of optical fibers by applying an optical pulse from a light source onto a plurality of optical fibers which are connected with a connector or fusion-connecting them at predetermined intervals and by converting a reflected light (back scattering light, Fresnel reflected light) returned from the measurement target optical fibers following the incidence of this optical pulse into an electric signal to thereby process the resultant electric signal.

In an optical communication system employing optical fibers, a plurality of optical fibers are connected with a connector or fusion-connected at predetermined intervals to thereby form one transmission line.

When providing the above-stated transmission line, an OTDR for making various measurements by applying an optical pulse onto the optical fibers of the transmission line to be tested and signal-processing a reflected light accompanying the incidence of this optical pulse is employed.

Figure 5:
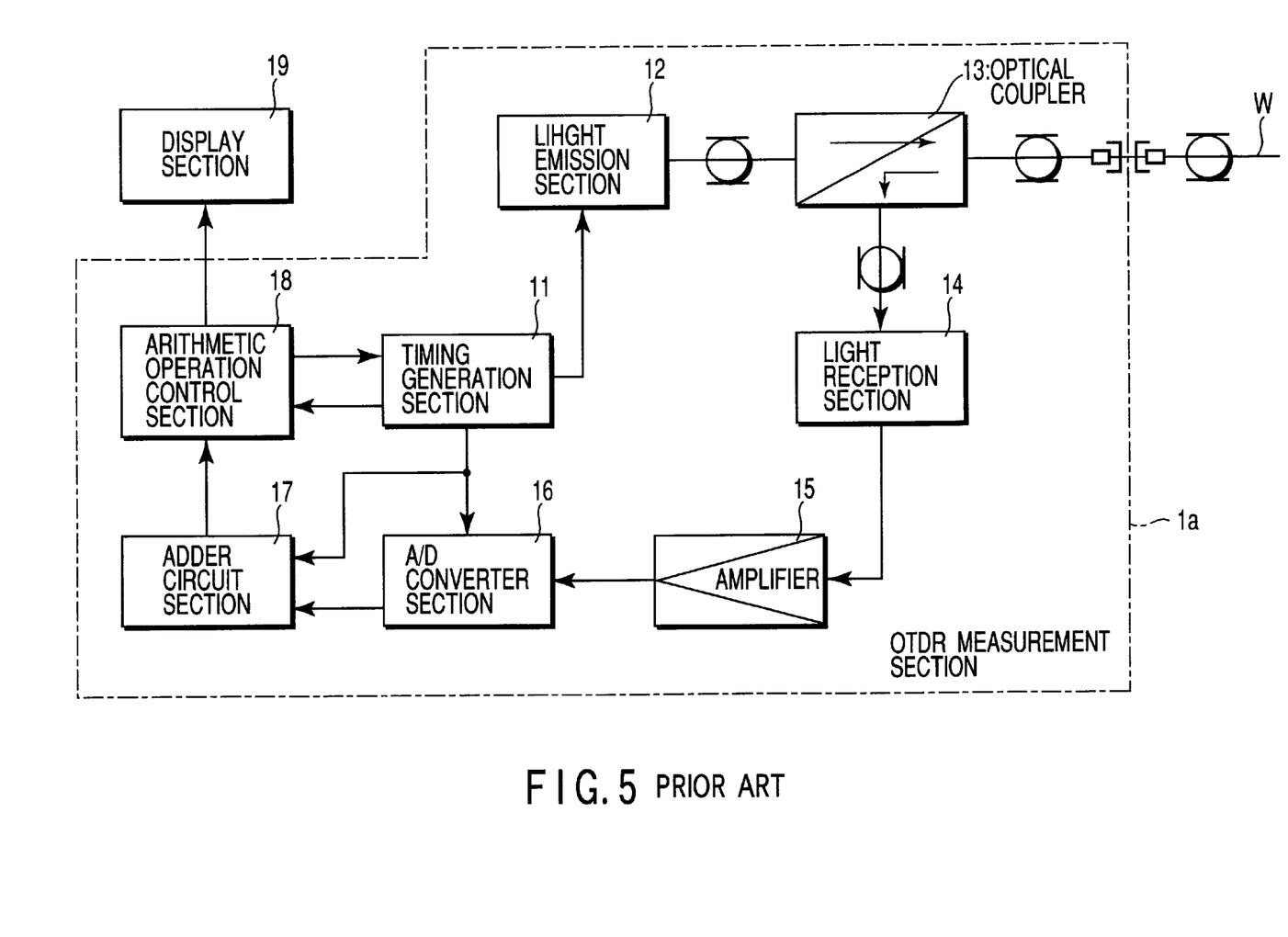
FIG. 5 is a block diagram showing the schematic constitution of a conventional OTDR.

FIG. 5 is a block diagram showing the schematic constitution of a conventional OTDR employed for the measurements of this type.

As shown in FIG. 5, this OTDR includes a timing generation section 11, a light emission section (light source) 12, an optical coupler 13, a light reception section 14, an amplifier 15, an A/D converter section 16, an adder circuit section 17 and an arithmetic operation control section 18 which serve as an OTDR measurement section 1a as a whole, as well as a display section 19 connected to the OTDR measurement section 1a.

In this OTDR, an optical pulse emitted from the light emission section 12 driven by a signal from the timing generation section 11 is incident on measurement target optical fibers W through the optical coupler 13.

Following the incidence of the optical pulse, a reflected light reflected and returned from the measurement target optical fibers W is received by the light reception section 14 through the optical coupler 13, amplified with a predetermined amplification factor by the amplifier 15 and introduced to the A/D converter section 16.

In the A/D converter section 16, after the output of the amplifier 15 is sampled in a predetermined sampling cycle, each of the sampled data is supplied to the adder circuit section 17.

The adder circuit section 17 adds together the sampled data for a predetermined time and averages the data.

Each of the averaged data is supplied to the arithmetic operation control section 18.

The arithmetic operation control section 18 conducts arithmetic operation on various measurements based on the respective averaged data. The operation results are displayed as numeric value data and waveform data by the display section 19.

Meanwhile, if a transmission line is tested by employing the above-stated OTDR and multiple optical fibers are employed, various measurements are conducted to the respective optical fibers. The defective optical fiber, if any, is retested.

If all of the measurement result for the optical fibers are proven to be normal, a test is conducted on the entire optical fibers by continuous measurements.

The continuous measurements means repeatedly measuring optical fibers connected to the OTDR while switching over the optical fibers one after another under the same conditions without changing basic settings, or continuously measuring one optical fiber while switching over the wavelengths of an optical pulse incident on one optical fiber one after another.

The other change items include a distance range.

Furthermore, in evaluating whether a transmission line is defective or non-defective, splice loss and return loss at connected portions, unit length loss at intervals of the optical fibers, the total loss and a total return loss of an optical fiber from a tip end to a terminal end thereof are measured.

With the conventional OTDR, however, the data obtained by the continuous measurements on a cite where the transmission line is provided is only stored in an external storage medium such as a floppy disk. An evaluation processing for the transmission line cannot be conducted on a measurement cite based on the data.

Due to this, it is disadvantageously required that after the data thus stored are brought back from the measurement site and analyzed and the transmission line is evaluated, the transmission line evaluated as defective is measured again on the site.

As can be seen, the conventional OTDR cannot conduct an evaluation operation for the transmission line on the site based on the measurement data obtained on the site and the conventional OTDR has, therefore, disadvantageously lower working efficiency.

In the drawing of the display screen of a conventional OTDR when selecting various types of items of the OTDR disclosed by U.S. Pat. No. 5,801,953, nothing is disclosed about conducting an evaluation operation to a transmission line on a measurement site based on measurement data obtained on the site.

BRIEF SUMMARY OF THE INVENTION

The present invention has been made in view of the above-stated disadvantages. It is, therefore, an object of the present invention to provide an optical time domain reflectometer capable of displaying a list of various measurement data measured in continuous measurements in units of files and improving the efficiency of an operator's evaluation operation for a transmission line on a measurement site.

To obtain the above object, according to one aspect of the present invention, there is provided an optical time domain reflectometer for receiving a return light of an optical pulse incident on a measurement target optical fiber formed out of a plurality of optical fibers coupled in series and for measuring splice loss, return loss and unit length loss of the measurement target optical fiber, comprising:

a maximum value detector receiving the return light and detecting a maximum value due to an absolute value for the splice loss, and maximum values for the return loss and the unit length loss, of the measurement target optical fiber, respectively; and a display unit displaying the maximum value due to the absolute value for the splice loss and the maximum values for the return loss and the unit length loss according to items of the splice loss, the return loss and the unit length loss, respectively, based on output from the maximum value detector.

Additional objects and advantages of the invention will be set forth in the description which follows, and in part will be obvious from. the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference numerals designate like or corresponding parts.

First, the outline of the present invention will be described.

To obtain the above-stated object, an optical time domain reflectometer according to the first invention is an OTDR changing at least one of a pulse width of the optical pulse incident on the measurement target optical fiber, a wavelength of the optical pulse incident on the measurement target optical fiber and a distance range, and for making continuous measurements including loss and fault or the like of the measurement target optical fiber, characterized by comprising means for extracting measurement data on a maximum value due to an absolute value for the splice loss and maximum values for the return loss and the unit length loss from among individual measurement results obtained by the continuous measurements for the splice loss, the return loss and the unit length loss, for extracting measurement data from the individual measurement results obtained by the continuous measurements for total loss and total return loss of the measurement target optical fibers, and for listing and displaying the extracted measurement data as a file for each measurement in a table form on a display screen.

An OTDR according to the. second invention is characterized in that measurement data on individual measurement items of a plurality of measurement results listed and displayed on the display screen in the table form are compared with preset reference data, respectively, and measurement data exceeding a value of the reference data is highlighted.

An OTDR according to the third invention is characterized in that individual measurement data in a file selected from among a plurality of files listed and displayed on the display screen in the table form and waveform data based on the measurement data are displayed on the display screen.

Next, the embodiment of the present invention will be described with reference to the accompanying drawings based on the above-stated outline.

Figure 1:
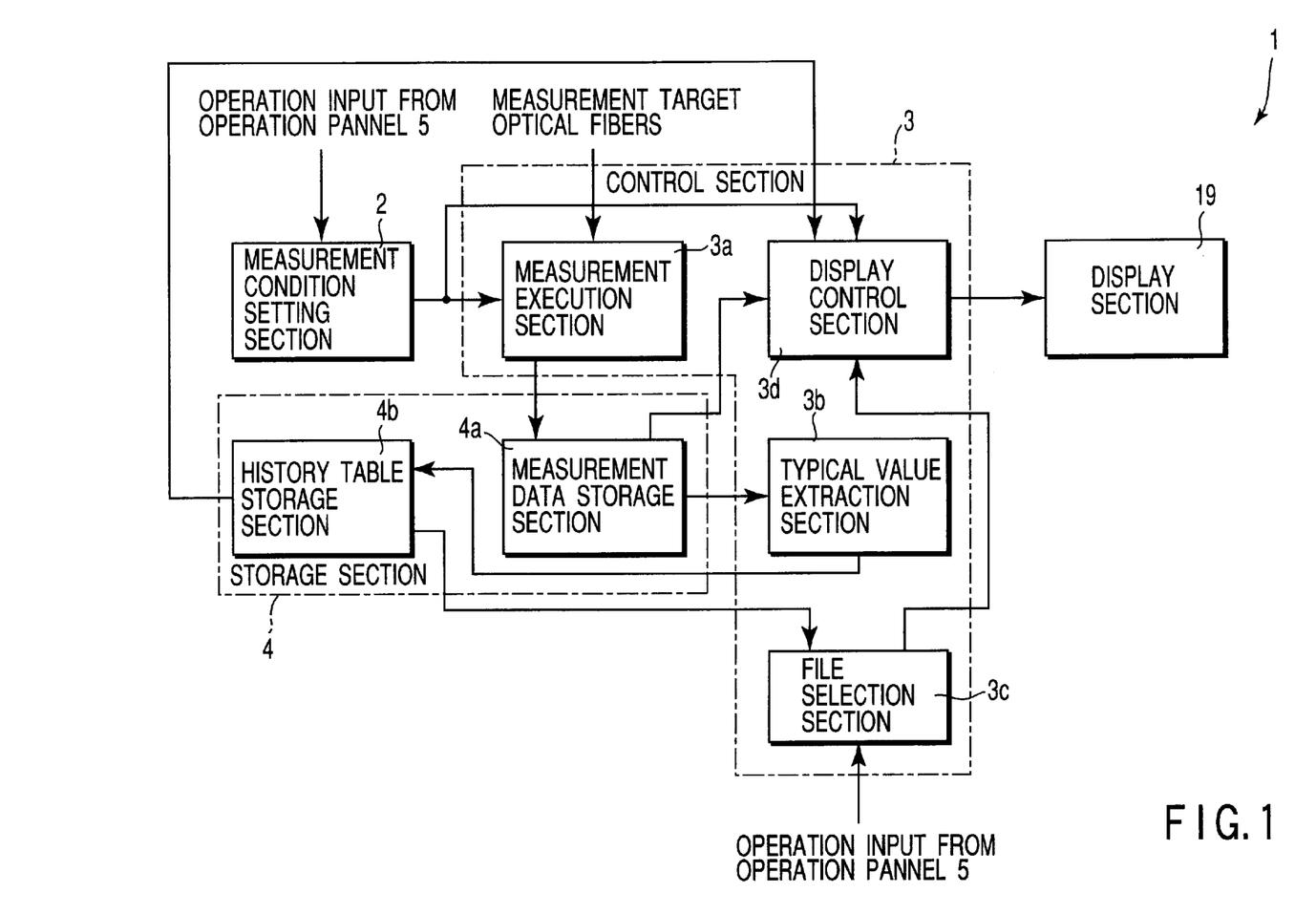
FIG. 1 is a functional block diagram of an OTDR according to the present invention.

FIG. 1 is a functional block diagram of an OTDR according to the present invention.

Figure 2:
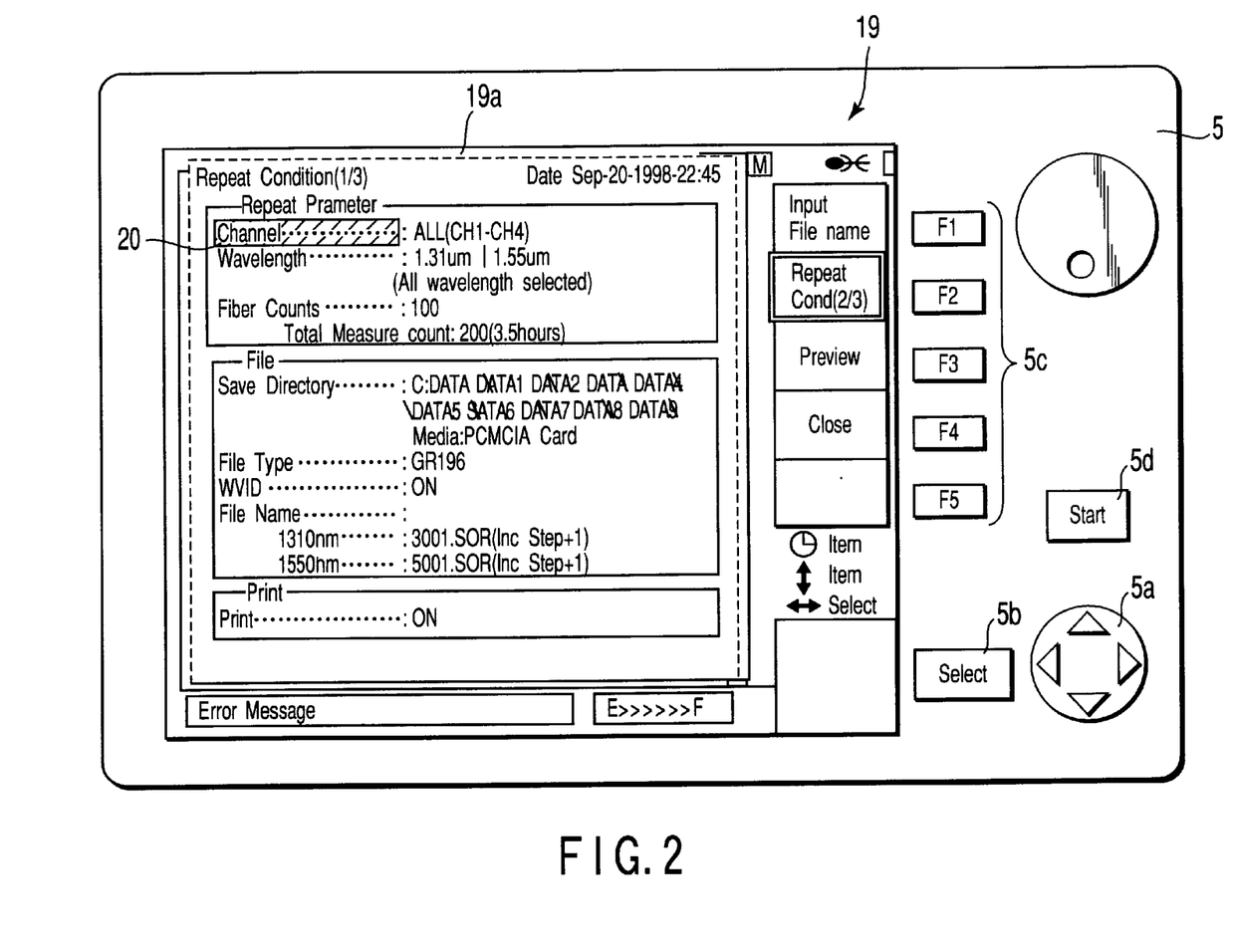
FIG. 2 shows one example of the screen of continuous measurements setting in the OTDR according to the present invention.

FIG. 2 shows one example of the screen of a continuous measurements setting in the OTDR according to the present invention.

Figure 3:
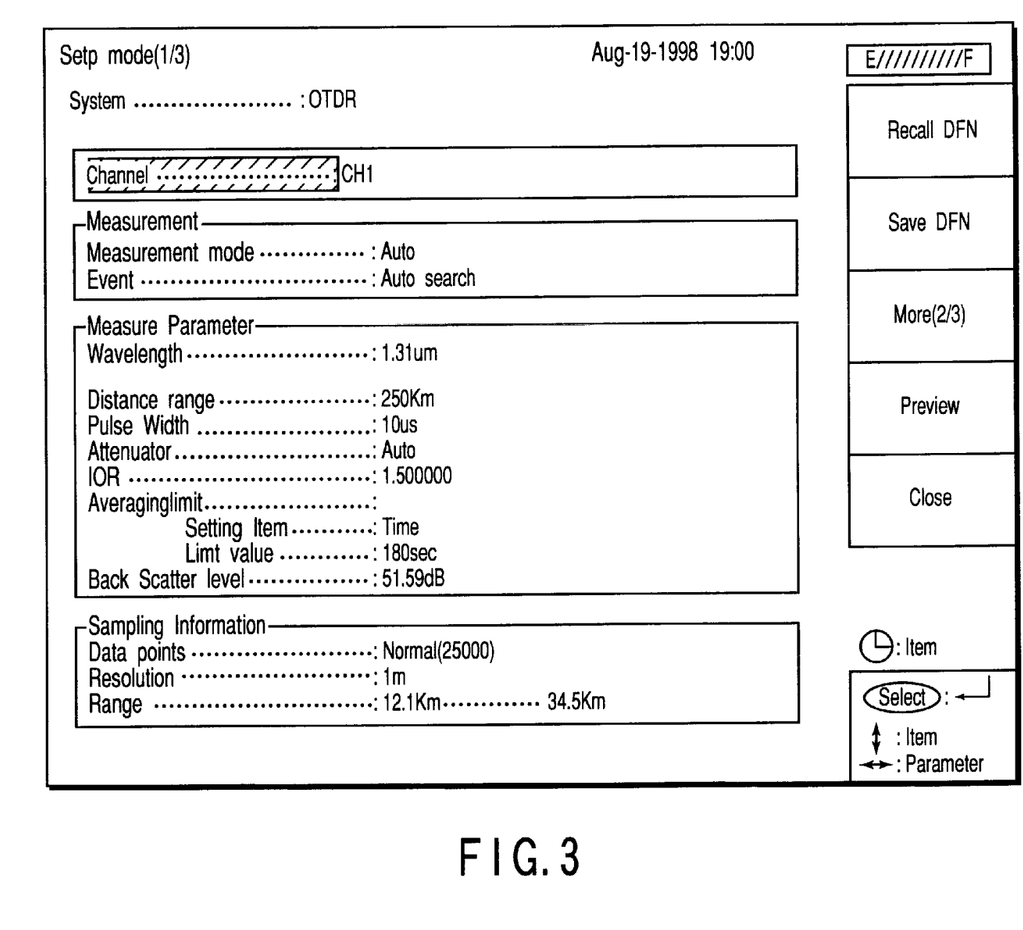
FIG. 3 shows one example of a display screen of a basic measurement setting in the OTDR according to the present invention.

FIG. 3 shows one example of a screen of a basic measurement setting in the OTDR according to the present invention.

Figure 4:
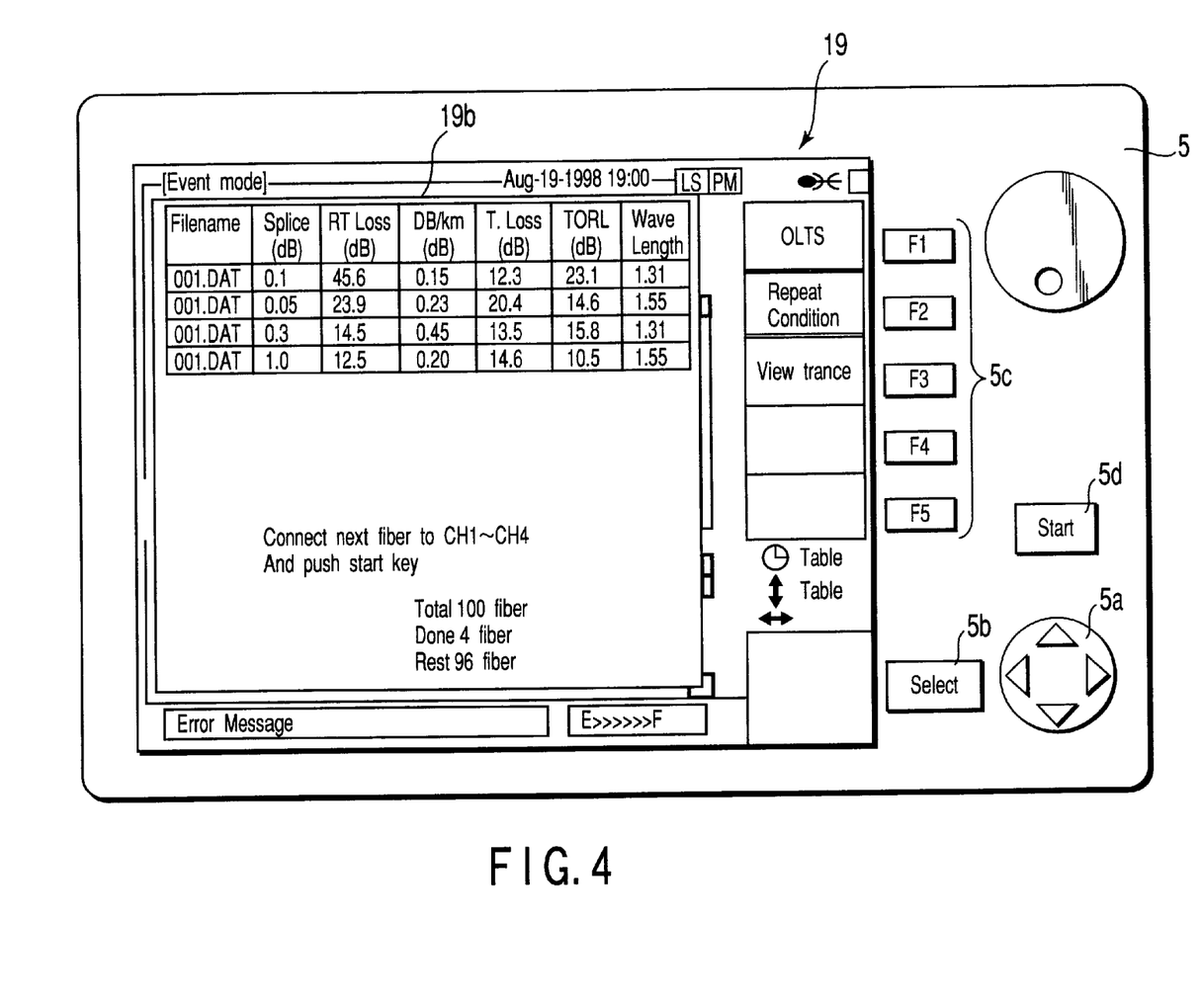
FIG. 4 shows the table display screen of measurement data on various measurement items relating to continuous measurements in the OTDR according to the present invention.

FIG. 4 shows the table display screen of measurement data on various measurement items relating to continuous measurements in the OTDR according to the present invention.

If the above-stated continuous measurements is made, switching control for switching over the wavelengths (e.g., 1.31 $\mu$m and 1.55 $\mu$m) of an optical pulse emitted from a light emission section 12, or channel switching control for switching over the channels of an optical switch unit (not shown) to which a plurality of measurement target optical fibers W are connected is conduced by measurement execution section and light switch unit attaches to an optical coupler 13.

As shown in FIG. 1, an OTDR 1 according to the present invention is comprised of a measurement condition setting section 2, a control section (CPU) 3, a storage section 4 and a display section 19.

In the OTDR 1 according to the present invention, the OTDR measurement section (not shown) is almost equivalent to the conventional OTDR measurement section 1a shown in FIG. 5 in the constitution and operation regarding ordinary measurement or the like. The description of the section 1a is not, therefore, given herein.

The measurement condition setting section 2 sets various setting conditions relating to the measurement of a measurement target fiber W formed out of a plurality of optical fibers coupled in series by the input operation of an operation panel 5. These pieces of setting information are inputted to a measurement execution section 3a and a display control section 3d, which sections will be described later, of the control section 3.

To be specific, in measuring the various characteristics of the measurement target optical fiber W, the wavelength of an incident optical pulse, a distance range, the number of averaging processings and the like are set as basic settings by the input operation of the operation panel 5 from a setup display screen, which is shown in FIG. 3, of the display section 19.

That is to say, the measurement condition setting section 2 sets conditions which form the basis of continuous measurements to be described later.

The measurement conditions in this case involve obtaining a distance range, a pulse width, a wavelength and the number of averaging processings appropriate for the measurement target optical fiber by first making a measurement only once.

Marker positions or event points of the measurement target optical fiber W are set.

It is noted that the marker setting can be made by a user oneself or automatically made by the OTDR.

Specifically, while a display screen as shown in FIG. 3 is being displayed on the display screen of the display section 19, measurement conditions suited for the measurement target optical fiber W are set.

The measurement conditions are set by a user or automatically set by the OTDR as appropriate conditions.

Next, a start key is depressed, a light is emitted to the measurement target optical fiber W and data are created.

Thereafter, the user sets marker positions or event points for the measurement data.

The marker positions and the event positions can be automatically set by the OTDR.

In this way, the basic measurement conditions are determined by the above operations.

Specifically, while continuous measurements setting screen 19a is being displayed on the display screen of the display section 19 as shown in FIG. 2, various measurement conditions necessary for continuous measurements such as an optical input port channel, wavelength, save directory, file type, file name, the on/off state of printer and the number of execution of continuous measurements can be set by the input operation of the operation panel 5.

Furthermore, the measurement condition setting section 2 can set reference data (alarm levels), respectively for each of various measurement items (splice loss, return loss, unit length loss, total loss and total return loss) relating to continuous measurements by the input operation of the operation panel 5.

These reference data are arbitrarily set by the input operation of a user based on standard values according to the standard relating to OTDR of, for example, GENERIC REQUIREMENTS GR-196-CORE ISSUE 1, SEPTEMBER 1995 (Generic Requirements for Optical Time Domain Reflectometer (OTDR) Type Equipment, Bellcore (Bell Communications Research)) pp. B-1 to B-12.

According to this standard (see, particularly, Table B-5. Key Event Block Summary), unit length loss, splice loss and return loss are specified as Attenuation Coefficient Lead-in Fiber, Event Loss and Event Reflectance, respectively.

As shown in FIG. 2, the operation panel 5 is provided with an arrow key 5a for moving a cursor 20 positioned on an arbitrary item on the setting display screen displayed on the display section 19, a select key 5b for selecting an item on which the cursor 20 is positioned, a plurality of function keys 5c (to be referred to as "F keys" hereinafter) and a start key 5d for indicating measurement start.

Each F key 5c (F1 to F5) is allotted a function corresponding to an item in an item menu displayed on the display screen of the display section 19 and the screen (e.g., the continuous measurements setting screen 19a as shown in FIG. 2) corresponding to the function of the depressed F key 5c is displayed on the display section 19.

The control section 3 is comprised of a measurement execution section 3a, a typical value extraction section 3b, a file selection section 3c and a display control section 3d.

The measurement execution section 3a corresponds to the OTDR measurement section 1a, i.e., the constituent elements (the timing generation section 11, the light emission section 12, the optical coupler 13, the light reception section 14, the amplifier 15, the A/D converter section 16, the adder circuit section 17 and the arithmetic operation control section 18) surrounded by a dashed line of FIG. 5.

Namely, the measurement execution section 3a applies an optical pulse onto the measurement target optical fiber W based on the settings made by the measurement condition setting section 2, converts a reflected light from the measurement target optical fiber W following the incidence of this optical pulse into an electric signal and processes the resultant electric signal.

By doing so, measurement data on various measurement items based on the settings of the measurement condition setting section 2 can be obtained.

The measurement data on the various measurement items are stored in a measurement data storage section 4a, which will be described later, of the storage section 4 for each measurement.

The typical value extraction section 3b reads the measurement data on the various measurement items obtained by the measurement execution section 3a for each measurement and stored in the measurement data storage section 4a, extracts typical values from the read measurement data, and stores the typical values in the history table storage section 4b.

The typical value extraction section 3b will be described in more detail. The typical value extraction section 3b extracts measurement data on a maximum value due to an absolute value for the splice loss and maximum values for the return loss and the unit length loss from among the measurement data on the measurement items of splice loss, return loss and unit length loss.

On the other hand, the typical value extraction section 3b extracts the read measurement data as they are for the measurement data on the measurement items of total loss and total return loss.

The file selection section 3c selects a desired file in a history table storage section 4b, which will be described later, of the storage section 4 by the input operation of the operation panel 5 while measurement data on the various measurement items relating to continuous measurements are being displayed on the display screen in a table form as shown in FIG. 4.

The selection information at this time is inputted to the display control section 3d.

To be specific, the cursor 20 on the table display screen 19b showing continuous measurement results as shown in FIG. 4 is operated by the arrow key 5a on the operation panel and positioned on a desired file. While the cursor 20 is positioned on the desired file, the F key 5c (F3) corresponding to "View trace" is depressed and the desired file is thereby selected.

The display control section 3d controls the contents of the display screen of the display section 19 based on the measurement conditions from the measurement condition setting section 2, the file data for each measurement extracted by the typical value extraction section 3b and stored in the history table storage section 4b, the selection information from the file selection section 3c and the measurement data stored in the measurement data storage section 4a, which will be described later, of the storage section 4.

Further, the display control section 3d controls the display of the table display screen 19b showing continuous measurement results displayed on the display section 19 based on the result of the comparison of the measurement data on the various items relating to continuous measurements and stored in the history table storage section 4b, which will be described later, of the storage section 4 with the reference data set by the measurement condition setting section 2.

To be specific, at the time of displaying the table display screen 19b as a list, which shows the continuous measurement results, on the display section 19, the measurement data on the measurement items exceeding the reference data and a file including the measurement data are displayed emphatically.

To emphasis data, there are methods of inversion-displaying a window, changing the color of characters (e.g., red) of the measurement data in the window and the like.

The storage section 4 is constituted by, for example, an external hard disk and consists of the measurement data storage section 4a and the history table storage section 4b.

The measurement data storage section 4a stores measurement data on various measurement items obtained by the measurement execution section 3a.

The history table storage section 4b stores measurement data on various measurement items relating to continuous measurements and extracted as data in units of file (data in units of files on the table display screen shown in FIG. 4) for each measurement by the typical value extraction section 3b.

Next, description will be given to the operation of the OTDR1 constituted as stated above at the time of continuous measurements executed under the control of the control section 3.

(1) First, while the display screen shown in FIG. 3 is being displayed on the display screen of the display section 19, basic measurement conditions are set such as the wavelength of an optical pulse incident on the measurement target optical fiber W, distance range the number of averaging processings.

Thereafter, the start key 5d on the operation panel 5 is depressed to execute measurement once and waveform sampling is conducted, thereby obtaining measurement data on various measurement items.

(2) Next, changed parts of the basic measurement conditions are set as measurement conditions necessary for continuous measurements.

To be specific, measurement conditions such as a light input port channel, wavelength, save directory for files, file type, on/off states of printer and the number of execution of continuous measurements are set by the input operation of the operation panel 5.

After these settings are made, the start key 5d on the operation panel 5 is depressed and continuous measurements start.

(3) The measurement data obtained by the above-stated measurement are stored in the measurement data storage section 4a and, at the same time, the maximum value due to the absolute value for the splice loss and the maximum values for the return loss and unit length loss are calculated from among the measurement data for splice loss, return loss and unit length loss, respectively. The calculated maximum values are extracted.

For total loss and total return loss, the measurement data indicate values of the entire transmission line, so that the values of the measurement data are extracted as they are.

(4) Next, the extracted measurement data on the various measurement items (splice loss, return loss, unit length loss, total loss and total return loss) are developed in a table form and listed and displayed on the display section 19 as a table display screen 19b showing the continuous measurement results.

At this moment, the extracted measurement data on the various measurement items are compared with the respective preset reference data (alarm levels) and the measurement data exceeding the reference data and the name of a file including such measurement data are displayed emphatically.

Thereafter, the measurement by (3) and (4) described above is repeated (continuous measurements).

When the continuous measurement is finished and the table display screen 19b showing the continuous measurement results is being displayed on the display screen of the display section 19, the file including the measurement data exceeding the respective preset reference data is selected by the arrow key 5a on the operation panel 5. When the F key 5c (F3) corresponding to "View trace" on the display screen is depressed, the measurement data relating to the selected file is read from the measurement data storage section 4a and the measurement data thus read as well as a waveform are displayed on the display screen of the display section 19.

At this moment, the table display screen 19a showing the continuous measurement results is closed on the display screen of the display section 19.

If the function of displaying the table display screen 19b showing continuous measurement results on the display section 19 is allotted to one of the F keys 5c as an item popping up on the display section 19 or allotted to another independent key provided on the operation panel 5, then it is possible to display the table display screen 19b showing the continuous measurement results on the display section 19 again by operating the F key or anther independent key in a state in which the measurement data and the waveform are being displayed.

As can be understood from the above, according to this embodiment, when continuous measurement is made, the measurement data on the maximum value due to absolute value for the splice loss and the maximum values for the return loss and the unit length loss are extracted from the measurement results for splice loss, return loss and unit length loss, and measurement data are extracted as they are for total loss and total return loss. The resultant data are entirely displayed on the display section 19 as the table display screen 19b for each measurement.

By doing so, an operator on the measurement site can easily grasp the continuous measurement results on the site only by looking at the table display screen 19b displayed for each measurement.

Further, the various measurement data on continuous measurements displayed on the table display screen 19b are compared with the preset reference data, respectively, for each measurement. The measurement data exceeding the reference data is highlighted, so that it is possible to grasp abnormal data at a glance and to conduct a transmission line evaluation on the site.

Besides, a re-measurement on a file including the abnormal data can be promptly executed, thereby improving working efficiency.

To be specific, while the table display screen 19b is being displayed, a file including the measurement data exceeding an initial value is selected by the arrow key 5a of the operation panel. If the F key 5c (F3) corresponding to "View trace" on the display screen is depressed, measurement data on the file are read from the measurement data storage section 4a. Then, by depressing the start key 5d, a re-measurement can be executed.

Moreover, if an arbitrary file is selected from among a plurality of files on the table display screen 19b by the input operation of the operation panel, if the F key 5c (F3) corresponding to "View trace" is depressed, individual measurement data in the selected file as well as waveform data thereof are read from the measurement data storage section 4a and displayed on the display section 19. Therefore, even the detailed data on the file including abnormal data can be promptly interpreted and evaluated on the site.

As is obvious from the above description, according to the OTDR of the first invention, measurement data on various measurement items obtained by continuous measurements are displayed as a list in units of files. Therefore, an operator on the measurement site can readily grasp the result of continuous measurements on the site only by looking at the displayed table screen as a list.

In this case, the file which displays the abnormal result can be analyze more detailed conditions by using the F key 5c (F3) corresponding to "View trace".

If necessary, the measurement capable of executing by depressing the start key 5d again.

Furthermore, according to the OTDR of the second invention, various measurement data on continuous measurements displayed on the table display screen are compared with preset reference data, respectively for each measurement and measurement data exceeding the reference data is displayed emphatically. Thus, it is possible to grasp abnormal data at a glance and to conduct a transmission line evaluation on the site.

Moreover, a re-measurement on a file including the abnormal data can be promptly executed and working efficiency can be, therefore, improved.

Additionally, according to the OTDR of the third invention, if an arbitrary file is selected from among a plurality of files on the table screen, individual measurement data in the selected file as well as and waveform data thereof are displayed. Therefore, even the detail data on the file including the abnormal data can be readily interpreted and evaluated on the site.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An evaluation apparatus for an optical fiber transmission line being a measurement target optical fiber formed by connecting a plurality of optical fibers each having a predetermined unit length in series, comprising:

a measurement execution section for executing a measurement with a function equivalent to a function of an optical time domain reflectometer (OTDR) that measures a splice loss, a return loss, and a unit length loss each indicating various evaluation characteristics of the measurement target optical fiber in response to a return light of an optical pulse input to the measurement target optical fiber;

a typical value extraction section for extracting data indicating maximum values of the return loss and the unit length loss, as typical values, from measured data indicating the various evaluation characteristics of the measurement target optical fiber measured by the measurement execution section, while simultaneously extracting data indicating a maximum value of the splice loss which is an absolute value; and a display section for displaying section for displaying the data of the maximum values of the return loss and the unit length loss extracted by the typical value extraction section as the typical values indicating the various characteristics of the measurement target optical fiber and the data of the maximum value of the splice loss which is the absolute value, in such a manner that items of the various characteristics respectively correspond to the data of the maximum values.

2. An evaluation apparatus according to claim 1, wherein said measurement execution section includes means for changing at least one of a pulse width of the optical pulse incident on said measurement target optical fiber, a wavelength of the optical pulse incident on the measurement target optical fibers and a distance range, and for making continuous measurements including loss and faults or the like of said measurement target optical fiber.

3. An evaluation apparatus according to claim 2, further comprising means for extracting measurement data regarding a maximum value due to an absolute value for the splice loss and maximum values for the return loss and the unit length loss from among individual measurement results obtained by said continuous measurements for the splice loss, the return loss and the unit length loss, for extracting measurement data from the individual measurements results obtained by said continuous measurements for total loss and total return loss of said measurement target optical fibers, and for listing and displaying the extracted measurement data as a file for each measurement n a table form on a display screen of said display section.

4. An evaluation apparatus according to claim 3, wherein measurement data on individual measurement items of a plurality of measurement results listed and displayed on the display screen in said table form are compared with preset reference data, respectively, and measurement data exceeding a value of the reference data is displayed emphatically.

5. An evaluation apparatus according to claim 3, wherein individual measurement data in a file selected from among a plurality of files listed and displayed on the display screen in said table form and waveform data based on the measurement data are displayed on the display screen.

6. An evaluation apparatus according to claim 4, wherein individual measurement data in a file selected from among a plurality of files listed and displayed on the display screen in said table form and waveform data based on the measurement data are displayed on the display screen.

7. An evaluation apparatus according to claim 1, further comprising:

a measurement condition setting section;

a control section; and a storage section;

wherein said control section comprises the measurement execution section, the typical value extraction section, a display control section, and a file selection section;

said storage section comprises a measurement data storage section and a history table storage section;

said measurement condition setting section sets various setting conditions relating to measurement of said measurement target optical fiber, and inputs setting information into said measurement execution section and said display control section of said control section;

said measurement execution section applies an optical pulse onto said measurement target optical fiber based on settings of said measurement condition setting section and converts a reflected light from the measurement target optical fiber following incidence of the optical pulse into an electric signal to process the electric signal, thereby obtaining measurement data on various measurement items based on the settings of said measurement condition setting section and storing the measurement data on the various measurement items in said measurement data storage section of said storage section for each measurement; and said typical value extraction section reads the measurement data on the various measurement items obtained for each measurement by said measurement execution section and stored in said measurement data storage section, and extracts typical values from the read measurement data.

8. An evaluation apparatus according to claim 7, wherein said typical value extraction section extracts measurement data on a maximum value due to an absolute value for the splice loss and maximum values for the return loss and the unit length loss from among the measurement data on measurement items of said splice loss, said return loss and said unit length loss.

9. An evaluation apparatus according to claim 7, wherein said typical value extraction section extracts the read measurement data as they are for measurement data on measurement items of total loss and total return loss..

10. An evaluation apparatus according to claim 7, wherein said control section comprises a file selection section; and said file selection section selects a desired file in said history table storage section of said storage section while the measurement data on various measurement items relating to continuous measurement are being displayed on a display screen in a table form, and inputs selection information into said display control section.

11. An evaluation apparatus according to claim 10, wherein said display control section controls contents of the display screen of said display section based on measurement conditions from said measurement condition setting section, file data extracted by said typical value extraction section for each measurement and stored in said history table storage section, selection information from said file selection section and measurement data stored in said measurement data storage section of said storage section.

12. An evaluation apparatus according to claim 10, wherein said display control section controls display of a table display screen of continuous measurement results displayed on said display section based on a result of comparison of the measurement data on various items relating to continuous measurement and stored in said storage history table storage section of said storage section with reference data respectively set by said measurement condition setting section.

13. An evaluation apparatus according to claim 12, wherein said display control section displays measurement data on the measurement items exceeding the reference data and a file including the measurement data when displaying the table display screen showing the continuous measurement results, as a list, on said display section.

14. An evaluation method for an optical fiber transmission line being a measurement target optical fiber formed by connecting a plurality of optical fibers in series, by an optical time domain reflectometer, comprising the steps of:

receiving a return light of an optical pulse incident on the measurement target optical fiber, and measuring splice loss, return loss and unit length loss of the measurement target optical fiber;

detecting a maximum absolute value for the splice loss and maximum values for the return loss and the unit length loss of said measurement target optical fiber in response to said return light; and displaying the maximum absolute value for the splice loss and the maximum values for the return loss and the unit length loss corresponding to items of said splice loss, the return loss and the unit length loss, respectively.

* * * * *